US011881565B2

(12) United States Patent
Thomas et al.

(10) Patent No.: US 11,881,565 B2
(45) Date of Patent: Jan. 23, 2024

(54) BATTERY PACK (71) Applicant: Commissariat à l'Énergie Atomique et aux Énergies Alternatives, Paris (FR)

(72) Inventors: Rémy Thomas, Echirolles (FR); Eric Fernandez, Saint Paul de Varces (FR); Sylvain Bacquet, Chasselay (FR); Léandro Cassarino, Talence (FR); Ghislain Despesse, Voreppe (FR); Yan Lopez, Renage (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 666 days.

(21) Appl. No.: 16/958,641

(22) PCT Filed: Dec. 24, 2018

(86) PCT No.: PCT/FR2018/053544
§ 371 (c)(1),
(2) Date: Jun. 26, 2020

(87) PCT Pub. No.: WO2019/129992
PCT Pub. Date: Jul. 4, 2019

(65) Prior Publication Data
US 2020/0373630 A1 Nov. 26, 2020

(30) Foreign Application Priority Data
Dec. 27, 2017 (FR) ..................... 1763252

(51) Int. Cl.
*H01M 10/44* (2006.01)
*H01M 10/42* (2006.01)
(Continued)

(52) U.S. Cl.
CPC ....... *H01M 10/441* (2013.01); *H01M 10/425* (2013.01); *H01M 10/482* (2013.01);
(Continued)

(58) Field of Classification Search
CPC .... H02J 7/0016; H02J 7/0024; H01M 10/441; H01M 2010/4271; H01M 2010/4278;
(Continued)

(56) References Cited

FOREIGN PATENT DOCUMENTS

GB         2 537 616 A    10/2016
WO    WO 2012/030455 A2    3/2012
WO    WO 2014/198929 A1   12/2014

OTHER PUBLICATIONS

International Search Report and Written Opinion for International Application No. PCT/FR2018/053544, dated Mar. 3, 2019.

*Primary Examiner* — Sarah A. Slifka
(74) *Attorney, Agent, or Firm* — Wolf, Greenfield & Sacks, P.C.

(57) ABSTRACT

A method of controlling a battery including a first control circuit and a plurality of modules arranged in series between first and second terminals. Each module includes, between third and fourth terminals, electric cells and switches and a second switch control circuit. The battery further includes at least one first data transmission bus coupling the first control circuit to each second control circuit, the first control circuit including a memory having chained lists stored therein. Each chained list includes elements each including an identifier of one of the electric cells and at least one first pointer designating another element in the chained list.

13 Claims, 3 Drawing Sheets

(51) Int. Cl.
*H01M 10/48* (2006.01)
*H02J 7/00* (2006.01)
*H01M 50/51* (2021.01)

(52) U.S. Cl.
CPC ........... *H01M 50/51* (2021.01); *H02J 7/0024* (2013.01); *H01M 2010/4271* (2013.01); *H01M 2010/4278* (2013.01)

(58) Field of Classification Search
CPC ... H01M 10/425; H01M 10/482; H01M 50/51
See application file for complete search history.

BATTERY PACK

This application is a national stage filing under 35 U.S.C. § 371 of International Patent Application Serial No. PCT/FR2018/053544, filed Dec. 24, 2018, which claims priority to French patent application FR17/63252, filed Dec. 27, 2017. The contents of these applications are incorporated herein by reference in their entireties.

BACKGROUND

The present invention concerns a battery of electric cells or accumulators, also called pack battery.

DISCUSSION OF THE RELATED ART

It is known to form a battery comprising a plurality of stages or modules, in each of which accumulators, also called cells, may be connected in series or in parallel by controllable switches. Such a battery is capable of delivering a voltage having a waveform capable of varying over time by varying the connection of the cells over time via the turning on or the turning off of the switches.

Figure 1:
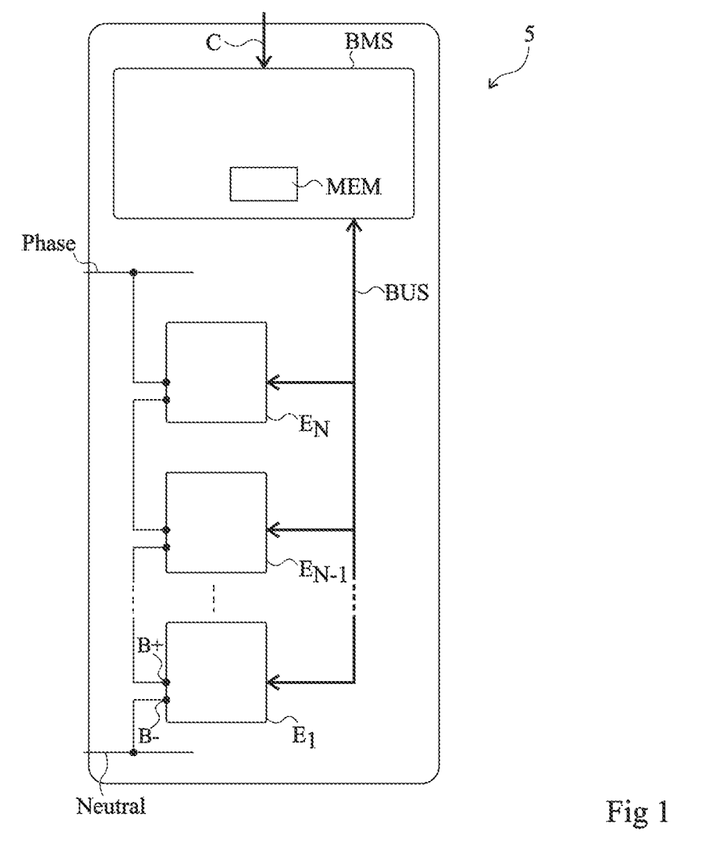
FIG. 1, previously described, partially and schematically shows an example of a cell battery.

FIG. 1 shows an example of such a battery 5. Battery 5 comprises N modules $E_1$ to $E_N$. Number N is an integer that may be in the range from 1 to 50. Each module comprises a positive terminal B+ and a negative terminal B− and a plurality of cells, not shown, capable of being connected to one another in series and/or in parallel via switches, not shown, between terminals B+ and B−. Modules $E_1$ to $E_N$ may be series-connected between a first terminal Neutral of battery 5 and a second terminal Phase of battery 5. An example of such a battery is described in patent application WO 2012/117110.

Battery 5 comprises a circuit BMS for controlling modules $E_1$ to $E_N$, called master control circuit hereafter. Master control circuit BMS may exchange data with each module $E_1$ to $E_N$ via a bidirectional data transmission BUS. Each module $E_1$ to $E_N$ comprises a circuit capable of controlling the switches of the module based on the control signals supplied by master control circuit BMS. This control circuit is called slave control circuit hereafter.

Each module may further comprise sensors, not shown, for example, sensors of the voltage across each cell of the module, sensors of the current supplied by each cell of the module, and/or sensors of the temperature of each cell of the module. The slave control circuit of each module $E_1$ to $E_N$ is capable of transmitting to master control circuit BMS data representative of the voltage, current, and/or temperature measurements over data transmission bus BUS. Master control circuit BMS may further comprise a sensor of the voltage between the phase and neutral terminals as well as a general current sensor and a temperature sensor.

Master control circuit BMS is capable of receiving a set point value C and of selecting the cells to be connected or disconnected for each module in order to comply with the set point value. Set point C may be a voltage or current set point, the cells to be connected or disconnected for each module then being selected to obtain the desired voltage and/or current between terminals Phase and Neutral of battery 5. As a variant, set point C may be a set point for a number of cells to be connected in series and/or in parallel between terminals Phase and Neutral of battery 5, the cells to be connected or to be disconnected for each module then being selected to obtain the number of cells connected in series and/or in parallel between terminals Phase and Neutral of battery 5 requested by the set point. Master control circuit BMS then delivers control signals to the modules via data transmission bus BUS, based on which the slave control circuit of each module connects or disconnects the cells according to the desired configuration.

It is desirable to perform the selection of the cells to be connected/disconnected by ensuring that each cell operates in its optimal operating range according to the voltage, current, and temperature measurements supplied by the modules. In particular, it is desirable to perform a balancing of the cells, that is, to perform the cell selection so that the differences between the states of charge of the cells are permanently as small as possible, and/or so that the differences between the currents capable of being supplied by the cells are permanently as small as possible and/or so that the differences between the cell temperatures are permanently as small as possible. It is further desirable for the cell selection to take into account a possible failure of a cell so as to, for example, exclude this cell from the selection.

To perform the balancing function, master control circuit BMS may determine a classification of the cells according to priority levels, the cells holding the highest priority in the classification being those which should be selected first. The priority classification, also called priority table, is capable of varying during the battery operation, particularly due to the variation of the states of charge of the cells or due to the failure of a cell.

It is desirable for master control circuit BMS to take into account the priority classification during the determination of the cell selection and in particular to take into account the time variation of the priority classification.

For certain applications, the set point received by management circuit BMS may vary rapidly so that it may be difficult for master control circuit BMS to select the cells to be connected/disconnected to follow the set point while taking into account a modification in the priority classification.

SUMMARY

Thus, an object of an embodiment is to provide a battery which overcomes at least some of the disadvantages of the previously-described batteries.

Another object of an embodiment is for the transmission of the control signals from the master control circuit of the battery to the slave control circuits of the modules in order to follow the set point not to be disturbed by the modification of the priority classification.

Thus, an embodiment provides a method of controlling a battery comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the electric cells to one another and to the third and fourth terminals of the module, and a second switch control circuit, the battery further comprising at least one first data transmission bus coupling the first control circuit to each second control circuit, the first control circuit comprising a memory having chained lists stored therein, each chained list comprising elements each comprising an identifier of one of the electric cells and at least one first pointer designating another element in the chained list, the method comprising the successive steps of:

a) reception by the first control circuit of a set point;

b) transmission, by the first control circuit to the second control circuits, of first control signals for the connection or the disconnection of at least one of the electric cells of the modules to follow said set point; and c) transmission, by the first control circuit to the second control circuits, of second control signals for the connection of one of the electric cells and the disconnection of another electric cell among the electric cells.

According to an embodiment, the set point is selected from the group comprising a set point for the delivery of a voltage between the first and second terminals, a set point for the delivery of a current to the first terminal, or a set point for the number of electric cells.

According to an embodiment, the method comprises the determination by the first control circuit, for at least a first element among the elements of one of the chained lists, of a new value of a second pointer designating a second element in the chained list or a third element in another chained list. Step c) comprises the successive steps of:

d) determining whether the first and second pointers of said element are different; and e) in the case where the first and second pointers are different, replacing the first pointer with the second pointer and transmitting, from the first control circuit to the second control circuits, second control signals for the connection or the disconnection of the electric cell corresponding to the identifier of the first element.

According to an embodiment, step e) comprises, in the case of the connection of the electric cell corresponding to the identifier of the first element, the transmission of second control signals for the disconnection of the electric cell corresponding to the identifier of a fifth element and, in the case of the disconnection of the electric cell corresponding to the identifier of the first element, the transmission of second control signals for the connection of the electric cell corresponding to the identifier of a fifth element.

According to an embodiment, the method comprises the determination by the first control circuit of a chained list comprising the elements for each of which a new value of the second pointer has been determined.

According to an embodiment, steps a), b), and c) are cyclically repeated, steps a) and b) being absent at least for one cycle when the set point does not vary at said cycle.

According to an embodiment, all the elements of one of the chained lists comprise identifiers of electric cells which are connected.

According to an embodiment, all the elements of one of the chained lists comprise identifiers of electric cells which are not connected and capable of being connected.

According to an embodiment, all the elements of one of the chained lists comprise identifiers of electric cells which are not connected and placed in quarantine.

According to an embodiment, the method comprises a first chained list among the chained lists associated with a battery charge operation and a second chained list among the chained lists associated with a battery discharge operation and the use, at steps b) and c), by the first control circuit, of the first chained list when the battery is in charge mode and of the second chained list when the battery is in discharge mode.

According to an embodiment, the method comprises a step of static allocation of a portion of the memory by the first control circuit, having the chained lists stored therein.

An embodiment also provides a battery comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the electric cells to one another and to the third and fourth terminals of the module, and a second switch control circuit, the battery further comprising at least one first data transmission bus coupling the first control circuit to each second control circuit, the first control circuit comprising a memory having chained lists stored therein, each chained list comprising elements each comprising an identifier of one of the electric cells and at least one first pointer designating another element in the chained list, the first control circuit being capable of:

a) receiving a set point;

b) transmitting to the second control circuits first control signals for the connection or the disconnection of at least one of the electric cells of the modules to follow said set point; and c) transmitting to the second control circuits second control signals for the connection of one of the electric cells and the disconnection of another electric cell among the electric cells.

According to an embodiment, the battery comprises a second data transmission bus coupling the first control circuit to each second control circuit, the first control circuit being capable of transmitting first data to the second control circuits over the first bus at a first rate and being capable of transmitting second data to the second control circuits over the second bus at a second rate smaller than the first rate.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. For the sake of clarity, only the elements that are useful for an understanding of the embodiments described herein have been illustrated and described in detail. In particular, the conventional functions carried out by a master control circuit of a cell battery such as the cell balancing are well known by those skilled in the art and are not described in further detail hereafter. In the following description, the expressions "substantially", "about", "approximately", and "in the order of" mean "within 10%", preferably within 5%.

Master control circuit BMS may correspond to a dedicated circuit and/or may comprise a processor, for example, a microprocessor or a microcontroller, capable of executing instructions of a computer program stored in the memory. Master control circuit BMS particularly comprises a data storage memory MEM.

An embodiment of a method of controlling systems with switched cells will be described in the case of a switched cell battery for which the cells correspond to switched cells. However, the present embodiments apply to any type of system with switched cells capable of supplying a variable voltage to a load. Each cell of the system with switched cells may correspond to an electric charge storage element or to an electric generator. An example of an electric charge storage element for example is an electric cell or a capacitor. An example of an electric generator is for example a fuel cell, a zinc-air cell, a photovoltaic cell, or a power recovery system, particularly a small wind power plant or a mini-turbine. The system switch switched cells may comprise electric charge storage elements only, electric generators only, or both electric charge storage elements and electric generators. When the system with switched cells comprises electric generators only, the use is theoretically in discharge mode only. However, in case of a reactive power, for brief passages through a negative power at each period, the inertia of the generator may be sufficient to smooth the power, for example, due to the rotation inertia and to the stray capacitances. Further, each generator may be connected in parallel to a resistive element, to accept negative powers, by dissipating this power. In operation, the system is intended to be coupled to a device which absorbs or supplies power according to the envisaged application. As an example, this device corresponds to an electric machine, for example, to an electric motor, or to the electric distribution network.

Figure 2:
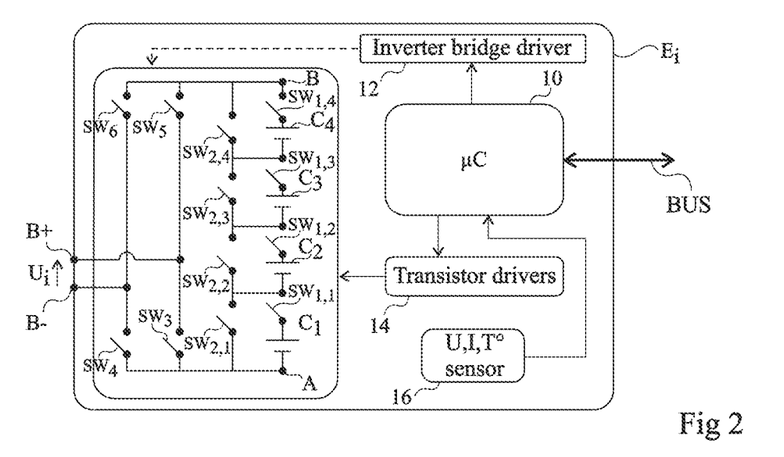
FIG. 2 partially and schematically shows an embodiment of a module of the battery of FIG. 1.

FIG. 2 shows an embodiment of module $E_i$, where i varies from 1 to N.

According to the present embodiment, module $E_i$ is capable of delivering a voltage $U_i$ between positive terminal B+ and negative terminal B−. Module $E_i$ comprises cells $C_1$ to $C_M$, where M is an integer in the range from 2 to 10, preferably from 2 to 5, four cells $C_1$, $C_2$, $C_3$, and $C_4$ being shown as an example in FIG. 2. Cells $C_1$ to $C_M$ are coupled to one another and to terminals B+ and B− by switches. In the present embodiment, for each cell $C_k$, k being an integer varying from 1 to M, module $E_i$ comprises a first switch $SW_{1,k}$ in series with cell $C_k$ and a second switch $SW_{2,k}$ in parallel with the assembly comprising cell $C_k$ and first switch $SW_{1,k}$. The M assemblies comprising cell $C_k$ and first switch $SW_{1,k}$ are arranged in series between a node A and a node B. The control of switches $SW_{1,k}$ and $SW_{2,k}$, with k varying from 1 to M, enables to place in series between nodes A and B from 1 to M cells among the M cells $C_1$ to $C_M$. In the present embodiment, module $E_i$ further comprises an inverter bridge, also called H bridge, between nodes A and B and terminals B+ and B−, which enables to apply the voltage present between nodes A and B between terminals B+ and B− in both directions. According to an embodiment, the inverter bridge comprises a switch $SW_3$ coupling node A to terminal B+, a switch $SW_4$ coupling node A to terminal B−, a switch $SW_5$ coupling node B to terminal B+, and a switch $SW_6$ coupling node B to terminal B−. As an example, each switch $SW_{1,k}$ and $SW_{2,k}$, with k varying from 1 to M, $SW_3$, $SW_4$, $SW_5$, and $SW_6$ may correspond to an insulated field-effect transistor, also called MOS transistor, particularly a MOS power transistor, for example, an N-channel MOS transistor.

Each module $E_i$ further comprises slave control circuit 10 (µC), capable of exchanging and of receiving data transmitted by master control circuit BMS over data transmission bus BUS. Slave control circuit 10 may correspond to a dedicated circuit or may comprise a processor, for example, a microprocessor or a microcontroller, capable of executing instructions of a computer program stored in the memory.

Each module $E_i$ further comprises a driver circuit 12 (Inverter bridge driver) coupled to switches $SW_3$, $SW_4$, $SW_5$, and $SW_6$ of the inverter bridge and a driver circuit 14 (Transistors driver) coupled to switches $SW_{1,k}$ and $SW_{2,k}$, with k varying from 1 to M. Each driver circuit 12, 14 is capable of converting the control signals delivered by slave control circuit 10 into signals capable of controlling the switches.

Each module $E_i$ further comprises sensors 16 (U, I, T° sensor) coupled to slave control circuit 10. Module $E_i$ may comprise, for each cell $C_k$, a temperature sensor capable of measuring the temperature of cell $C_k$. Module $E_i$ may further comprise, for each cell $C_k$, a voltage sensor capable of measuring the voltage across cell $C_k$. Module $E_i$ may further comprise a current sensor capable of measuring the current flowing at node A or at node B. The slave control circuit 10 of each module $E_i$ is capable of transmitting third data to master control circuit BMS over data transmission bus BUS, representative of the measurements performed by the sensors 16 of module $E_i$. The number and the type of sensors particularly depend on the arrangement of the cells of module $E_i$. In the cell arrangement shown in FIG. 2, a single sensor of the current flowing at node A or at node B may be provided.

In the embodiment of a battery module $E_i$ illustrated in FIG. 2, an order of connection of a cell $C_k$ of a module $E_i$ means that cell $C_k$ should be series-connected between the nodes A and B of module $E_i$, which is obtained by turning on switch $SW_{1,k}$ and by turning off switch $SW_{2,k}$, and an order of disconnection of a cell $C_k$ of a module $E_i$ means that cell $C_k$ should not be series-connected between the nodes A and B of module $E_i$, which is obtained by turning off switch $SW_{1,k}$ and by turning on $SW_{2,k}$. However, for a different arrangement of the cells $C_k$ of module $E_i$ where cells $C_k$ may be arranged in series or in parallel between nodes A and B, an order of connection of cells $C_k$ further specifies in which configuration, series or parallel, cell $C_k$ is placed with respect to the other cells of module $E_i$.

According to an embodiment, a priority table is stored in memory MEM of master control circuit BMS, for example in the form of a table, each row of the table for example corresponding to a row of memory MEM. As an example, for a battery comprising N cells, an identifier is assigned to each cell, for example, a number which varies from 1 to N. For a battery 5 comprising N cells, the priority table comprises N rows, each row j, j being an integer varying from 1 to N, being associated with the cell having number j. For each cell, the priority level of the cell is in particular stored in the priority table. As an example, for a battery comprising N cells, the priority levels of the cells range from 1 to N, priority level "1" being the highest and priority level "N" being the lowest. Master control circuit BMS may change the priority levels of the cells of the priority table, particularly based on the data transmitted by modules $E_i$, with i varying from 1 to N, resulting from the measurements of the sensors of modules $E_i$. The expression update of the priority table designates a modification of the priority levels of at least certain cells by master control circuit BMS.

Master control circuit BMS associates, with each cell having a given priority level, a pointer, called next priority pointer hereafter, which designates the cell of the priority table which has the priority level just higher than the given priority level.

The previous priority pointer associated with the cell having the highest priority level in the priority table designates no other cell and may comprise a reference value called Null. The next priority pointer associated with the cell having the lowest priority level in the priority table designates no other cell and may comprise a reference value called Null.

An update operation comprises determining new priority levels in the priority table for the cells. Master control circuit BMS further associates, with each cell, a pointer, called future previous priority pointer hereafter, which designates the cell in the priority table which has the priority level just higher than the new priority level of the cell in the update of the priority table and a pointer, called future next priority pointer hereafter, which designates the cell in the priority table which has the priority level just lower than the new priority level of the cell in the update of the priority table. According to an embodiment, the next and previous pointers and the future next and previous pointers may be stored in the priority table.

According to an embodiment, master control circuit may transmit first control signals corresponding to orders for the connection/disconnection of the cells to the slave control circuits to follow set point C and may further transmit second control signals corresponding to orders for the connection/disconnection of the cells to the slave control circuits to take into account an update of the priority table.

According to an embodiment, master control circuit BMS uses chained lists to determine the orders of cell connection/disconnection to be carried out. A chained list designates in computer science a data structure representing an ordered collection of arbitrary size of elements of the same type, represented in the computer memory by a succession of elements made of content and of at least one pointer to another element. To give an image, the assembly of elements resembles a chain where the links would be the elements. All the data relative to each chained list may be stored in memory MEM of master control circuit BMS.

Figure 3:
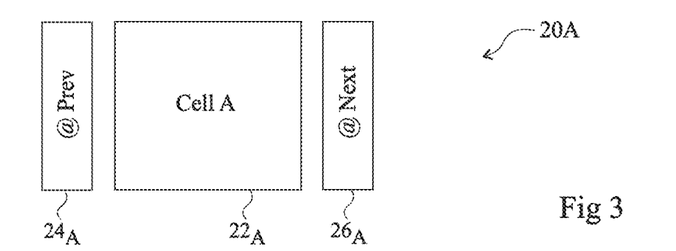
FIG. 3 schematically shows an element 20 of a chained list used during the operation of the battery shown in FIG. 1.

FIG. 3 schematically shows an element $20_A$ of the chained list. Each element $20_A$ comprises:
- an identifier $22_A$ (Cell A) of one of the cells of battery 5, for example, the same as that used in the priority table;
- a pointer $24_A$ (@ Prev) which designates an element of the chained list corresponding to a cell having a priority level higher than that corresponding to element $20_A$ in the version of the priority table before update, and which is called previous pointer $24_A$ in the rest of the disclosure; and
- a pointer $26_A$ (@ Next) which designates an element of the chained list corresponding to a cell having a priority level lower than that corresponding to element $20_A$ in the version of the priority table before update, and which is called next pointer $26_A$ in the rest of the disclosure.

In the rest of the disclosure, it is indifferently spoken of a cell or of the associated element of a chained list.

According to an embodiment, each chained list comprises a portion only of the cells of battery 5. Two elements of two different chained lists associated with the same battery cell have the same identifier $22_A$. However, the values of the previous pointer $24_A$ and of the next pointer $26_A$ of two elements of two different chained lists associated with the same battery cell may be different. Similarly, the previous pointer $24_A$ of a cell of a chained list may be different from the previous priority pointer used for this cell in the priority table and the next pointer $26_A$ of a cell of a chained list may be different from the next priority pointer used for this cell in the priority table.

Figure 4:
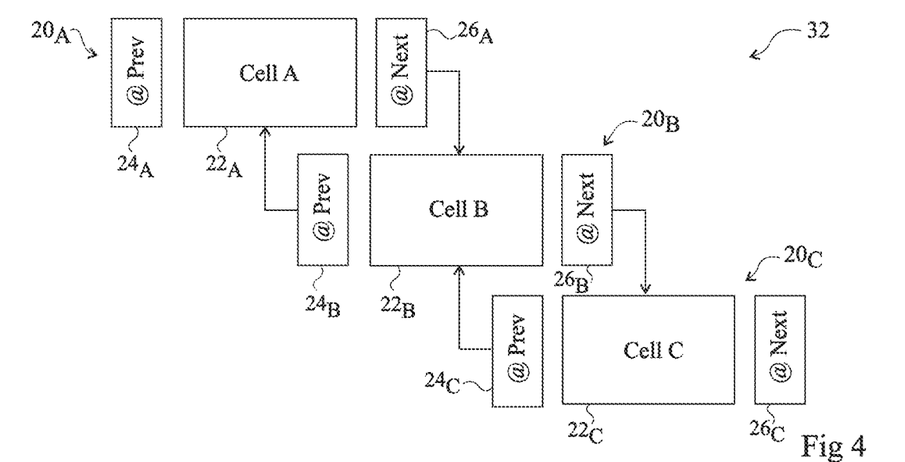
FIG. 4 partially and schematically shows an example of one of the chained lists used during the operation of the battery shown in FIG. 1.

FIG. 4 partially and schematically shows an example of a chained list 32 capable of being used by master control circuit BMS comprising, as an example, three elements $20_A$, $20_B$, and $20_C$. The next pointer $26_A$ of element $20_A$ designates element $26_B$ of the chained list and the previous pointer $24_B$ of element $26_B$ designates element $20_A$ of the chained list. The next pointer $26_B$ of element $20_B$ designates element $26_C$ of the chained list and the previous pointer $24_C$ of element $26_C$ designates element $20_B$ of the chained list. This means that, in the version before update of the priority table, the priority level of element $20_A$ is higher than the priority level of element $20_B$ and that the priority level of element $20_B$ is higher than the priority level of element $20_C$.

The chained list comprises two specific elements, the elements $20_A$ and $20_C$ located at the ends of the chained list. The previous pointer $26_A$ of element $20_A$ of the chained list does not designate an element in the chained list and comprises a reference value called Null. The next pointer $26_C$ of element $20_C$ of the chained list does not designate an element of the chained list and comprises reference value Null.

The elements of a chained list are arranged in ordered fashion from the first element of the chained list to the last element of the chained list. In the example shown in FIG. 4, the first element of chained list 32 may correspond to element $20_A$ or to element $20_B$ according to the way in which the elements are arranged in the chained list. The rank of an element in the chained list corresponds to the position of this element counted from the first element $20_A$ of the chained list.

The removal of an element from a chained list will be illustrated with the chained list 32 of FIG. 4. As an example, the removal of element $20_B$ is obtained by modifying the next pointer $26_A$ of element $20_A$ so that it designates element $20_C$ and by modifying the previous pointer $24_C$ of element $20_C$ so that it designates element $20_A$. The removal of element $20_A$ is obtained by modifying the previous pointer $24_B$ of element $20_B$ so that it designates reference value Null. The removal of element $20_C$ is obtained by modifying the next pointer $26_B$ of element $20_B$ so that it designates reference value Null.

The addition of a new element within a chained list is obtained by modifying the adapted pointers of the elements having the new element inserted therebetween so that they designate the new element and by modifying the next and previous pointers of the new element so that they designate the elements having the new element inserted therebetween. As an example, the addition of a new element, not shown, between elements $20_A$ and $20_B$ of chained list 32 is obtained by modifying the next pointer $26_A$ of element $20_A$ so that it designates the element, by modifying the previous pointer $24_B$ of element $20_B$ so that it designates the new element, by modifying the previous pointer of the new element so that it designates element $20_A$, and by modifying the next pointer of the new element so that it designates element $20_B$.

The addition of a new element at one end of a chained list will be illustrated by the addition of a new element at the end of the chained list 32 corresponding to element $20_A$. This addition is obtained by modifying the previous pointer of the element $20_A$ which was initially at the end of chained list 32 so that it designates the new element, by modifying the next pointer of the new element so that it designates the element $20_A$ which was initially at the end of chained list 32, and by modifying the next pointer of the new element so that it designates reference value Null.

Master control circuit BMS may use a plurality of chained lists. According to an embodiment, master control circuit BMS uses a chained list having its elements corresponding to the usable cells of battery 5 which are connected or disconnected. Such a chained list is called list of valid cells hereafter. The elements of the list of valid cells may be arranged with the first element corresponding to the cell having the highest priority level in the version before update of the priority table. The connected cells are then all located in the first portion of the list of valid cells form the first position in the list of valid cells and the disconnected cells are all located in the second portion of the list of valid cells all the way to the last position in the list of valid cells. Master control circuit BMS may use a position pointer which is maintained up to date to mark the position in the chained list of the last connected element having the lowest priority level. As a variation, the pointer may designate the first disconnected element having the highest priority level.

According to another embodiment, instead of the list of valid cells, master control circuit BMS uses two chained lists, one chained list having its elements corresponding to the cells of battery 5 which are connected, and being called list of connected cells hereafter, and one chained list having its elements corresponding to the cells of battery 5 which are not connected but which are capable of being connected, and being called list of disconnected cells hereafter. The elements of the list of disconnected cells may be arranged with the first element corresponding to the cell having the highest priority level in the version before update of the priority table among the disconnected cells. The elements of the list of connected cells may be arranged with the first element corresponding to the cell having the lowest priority level in the version before update of the priority table among the connected cells.

According to an embodiment, master control circuit BMS further uses a chained list having its elements corresponding to cells of battery 5 which are not connected and which cannot be selected. Such elements and the corresponding cells are said to be in quarantine hereafter and the chained list is called quarantine list hereafter. Master control circuit BMS is capable of determining that a battery cell should be placed in quarantine and the corresponding element should be displaced in the quarantine list particularly based on the signals delivered by the sensors of modules $E_i$, with i varying from 1 to N.

According to another embodiment, master control circuit BMS uses, instead of a list of cells in quarantine, two chained lists or more than two chained lists of elements placed in quarantine according to the conditions which have resulted in discarding the corresponding cells. A chained list may comprise elements temporarily placed in quarantine. Such a chained list is called temporary quarantine list hereafter. Another chained list may comprise elements definitively placed in quarantine, the corresponding cells of which should be replaced. Such a chained list is called definitive quarantine list hereafter. In the previously-described quarantine lists, elements may be arranged with the first element corresponding to the cell having the highest priority level in the version before update of the priority table among the cells of the chained list. As a variant, the elements may be arranged in the quarantine list by order of arrival in the chained list.

According to an embodiment, the same priority table is used both for a charge operation and for a discharge operation. Such an embodiment may be implemented when only the states of charge of the cells are taken into account for the determination of the priority levels of the battery cells. Indeed, in this case, the priority levels for a charge operation may be symmetrical to the priority levels for a discharge operation, that is, the order of the priority levels of the cells, from the highest priority to the lowest priority, for an operation of discharge of battery 5 is the inverse of the order of the priority levels of the cells, from the highest priority to the lowest priority, for a charge operation. According to an embodiment, when it is passed from a charge operation to a discharge operation and conversely, master control circuit BMS reverses the classification of the priority levels in the priority table.

According to another embodiment, master control circuit BMS may use two priority tables, a first priority table which is used during a charge operation, called charge priority table, and a second priority table which is used during a discharge operation, called discharge priority table. Such an embodiment may be advantageous if additional criteria are taken into account, in addition to the state of charge, for the determination of the priority levels of the battery cells, for example, the cell temperature, the state of health of the cell, or the internal impedance of the cell. Indeed, may then be desirable for the priority levels of the cells for a charge operation not be symmetrical to the priority levels of the cells for a discharge operation. Further, master control circuit BMS may use different chained lists according to whether battery 5 is in charge or in discharge mode.

Thus, master control circuit BMS may comprise a list of valid cells for a charge operation (or a list of connected cells for a charge operation and a list of disconnected cells for a charge operation), a list of valid cells for a discharge operation (or a list of connected cells for a discharge operation and a list of disconnected cells for a discharge operation), a temporary quarantine list for a charge operation and a temporary quarantine list for a discharge operation.

According to another embodiment, instead of a list of cells in temporary quarantine for a charge operation and a list of cells in temporary quarantine for a discharge operation, master control circuit BMS may use more than two chained lists of elements placed in temporary quarantine according to the conditions which have resulted in discarding the corresponding cells A chained list may comprise elements temporarily placed in quarantine when at least one of the operating parameters of the corresponding cells for example, the cell temperature, the cell charge rate, the voltage across the cell, etc. is outside of a normal operating range. Such a chained list is called list of temporary quarantine due to a voltage/temperature cause hereafter. Master control circuit BMS may use a list of temporary quarantine due to a voltage/temperature cause for charge operations and a list of temporary quarantine due to a voltage/temperature cause for discharge operations.

According to an embodiment, the number of connection/disconnection operations that the slave control circuit 12 of a module $E_i$, with i varying from 1 to N, can perform per time unit may be limited due to the structure of the power supply circuits of the internals components of module $E_i$. Another chained list may comprise elements temporarily placed in quarantine because the modules containing the corresponding cells have exceeded the authorized threshold of connection/disconnection operations per time unit. Such a chained list is called list of temporary quarantine due to a power supply cause hereafter. For the list of quarantine due to a power supply cause and the definitive quarantine list, it may not be useful to provide different chained lists for the charge and discharge operations since the criteria which cause the displacement of an element into one of these lists may be the same for a charge or discharge operation.

According to an embodiment, for a charge or discharge operation, a single element in one of the selection lists used for the charge or discharge operation corresponds to each cell of the battery. It is then indifferently spoken of the cell or of the corresponding element in the rest of the disclosure. More particularly, in the case where master control circuit BMS uses, without distinguishing charge operations and discharge operations, a list of connected cells, a list of disconnected cells, and at least one list of cells in quarantine, each cell is either in the list of connected cells, or in the list of disconnected cells, or in one of the lists of cells in quarantine.

According to an embodiment, in the case where master control circuit BMS uses a list of connected cells for a charge operation, a list of connected cells for a discharge operation, a list of disconnected cells for a charge operation, a list of disconnected cells for a discharge operation, a list of temporary quarantine due to a voltage/temperature cause for a charge operation and a list of temporary quarantine due to a voltage/temperature cause for a discharge operation, and at least another common quarantine list for charge and discharge operations, each cell is in one of the following chained lists:
  the list of connected cells for a charge operation, the list of disconnected cells for a discharge operation, the list of temporary quarantine due to a voltage/temperature cause for a charge operation, or another common quarantine list for charge and discharge operations;
  and in one of the following lists:
  list of connected cells for a discharge operation, list of disconnected cells for a discharge operation, the list of temporary quarantine due to a voltage/temperature cause for a discharge operation, or another common quarantine list for charge and discharge operations.

However, advantageously, certain combinations may be excluded. As an example, it may be provided for a cell not be able to be both in the list of connected cells for a charge operation and in the list of temporary quarantine due to a voltage/temperature cause for a discharge operation. Indeed, without this exclusion, when it is passed from a charge operation to a discharge operation, the element of the charge list of connected cells, which thus corresponds to a cell which is electrically connected, is in the list of temporary quarantine due to a voltage/temperature cause for a discharge operation, while still corresponding to a cell which is electrically connected. It would then be necessary for the transition from a charge operation to a discharge operation (or from a discharge operation to a charge operation) to apply an additional processing to the list of temporary quarantine due to a voltage/temperature cause for a discharge (or charge) operation to disconnect the cells which are still electrically connected, which implies additional processing time. The fact of providing exclusions thus enables to ease transitions between the charge and discharge operations.

In the following description, the previously-described chained lists used by master control circuit BMS for the determination of the first and second control signals are called selection lists.

In the case where there is no distinction between the charge and discharge operations, master control circuit BMS associates with each cell of the battery the previous pointer of this element in the selection list containing the element, the next pointer of this element in the selection list contain-ing the element, and appurtenance data enabling to directly or indirectly determine to which selection list the cell belongs.

In the case where a distinction is made between the selection lists associated with a charge operation and the selection lists associated with a discharge operation, the previous data are associated with each cell both for the selection list associated with a charge operation and for the selection list associated with a discharge operation. When the cell belongs to two selection lists, one associated with a charge operation and the other associated with a discharge operation, the previous pointer, the next pointer, and the appurtenance data indicated at the previous phase are associated with the cell both for the selection list associated with a charge operation and the selection list associated with a discharge operation. An advantage of the previously-described embodiment is that the management of the chained lists may implement a static memory allocation since a known maximum number of data is stored for each cell of the battery.

In the rest of the disclosure, unless otherwise indicated, it is considered for more simplicity that an element belongs to a single selection list. However, in the case where the element belongs to two selection lists, one associated with a charge operation and the other associated with a discharge operation, the steps described hereafter are to be carried out for each selection list.

The update of the priority table particularly comprises the determination by master control circuit BMS, for each cell, of a new value of the cell priority level. The update of the priority table further comprises the determination of new values for the future previous and next pointers to take into account changes in priority levels. To perform an update of the priority table, master control circuit BMS may use a copy of the priority table, called temporary priority table, having algorithms applied thereto to determine the new values of the priority levels and of the future pointers. When all the new values of the temporary priority table are determined, master control circuit BMS stops the use of the priority table and uses the temporary priority table. The temporary priority table then becomes the updated priority table and the priority table used up to then by master control circuit for the determination of the first and second control signals may be used as the next temporary priority table. The update of the priority table may be performed as a background task by master control circuit BMS, when the resources of master control circuit BMS are not used to implement the cell control method that will be described. In the case where a charge priority table and a discharge priority table are used, master control circuit updates the two priority tables separately. According to an embodiment, when master control circuit BMS updates the charge priority table, it also updates the discharge priority table, and conversely.

According to an embodiment, in addition to the selection lists, master control circuit BMS uses an additional chained list containing the elements which are likely not to be correctly placed in the selection lists. This chained list is called sorting list hereafter. An element present in the sorting list is thus always present in at least one of the selection lists.

When a single priority table is used, elements may be incorrectly placed in the selection lists due to a change in priority levels resulting from an update of the priority table or during a transition between a charge and discharge operation.

Elements may be incorrectly placed in the selection lists for several reasons when a charge priority table and a discharge priority table are used:
- elements may be incorrectly placed in the selection lists associated with a charge operation due to a change in priority levels resulting from an update of the charge priority table;
- elements may be incorrectly placed in the selection lists associated with a discharge operation due to a change in priority levels resulting from an update of the discharge priority table;
- elements may be incorrectly placed in the selection lists associated with a charge operation due to a change in priority levels resulting from an update of the discharge priority table while the battery is in discharge mode, which would cause inconsistencies when it is passed from the discharge operation to a charge operation; and
- elements may be incorrectly placed in the selection lists associated with a discharge operation due to a change in priority levels resulting from an update of the charge priority table while the battery is in charge mode, which would cause inconsistencies when it is passed from the charge operation to a discharge operation.

According to an embodiment, master control circuit BMS may use a single sorting list comprising all the elements capable of not being correctly placed for a charge or discharge operation. According to an embodiment, during the update of the charge or discharge priority table, all the elements of the priority table may be placed by default in the sorting list. This enables to be sure to process placement inconsistencies with respect to the new priority sets and with respect to the transitions between the charge and discharge operations.

According to another embodiment, master control circuit BMS may add an element to the sorting list when the future next and previous pointers have been modified by the update of the priority table. In the case where a charge priority table and a discharge priority table are used, master control circuit BMS may use a sorting list for a charge operation, called charge sorting list, and a sorting list for a discharge operation, called discharge sorting list. As a variant, master control circuit BMS may use a sorting list, called common sorting list, which comprises the elements to be sorted in the same way during an update of the charge priority table and of the discharge priority table or during a switching from a charge selection list to a discharge selection list or, conversely, during a change of a transition of the battery between the charge and discharge mode, a sorting list, called charge specific sorting list, which comprises the elements to be sorted when at least one of the priority tables is updated or to be re-sorted after an alternation with the charge operating mode.

Master control circuit BMS may update the sorting list or the sorting lists at each update of the charge or discharge priority table.

As described hereafter, a sorting operation is implemented to correctly place the elements present in the sorting list or the sorting lists. When an element is sorted, this element may be removed from the sorting list if the priority levels are not modified and if there has been no alternation between a charge operation and a discharge operation. A convergence towards a steady state where all elements are sorted as long as the priority levels and the operating mode (charge or discharge) do not change is obtained.

Figure 5:
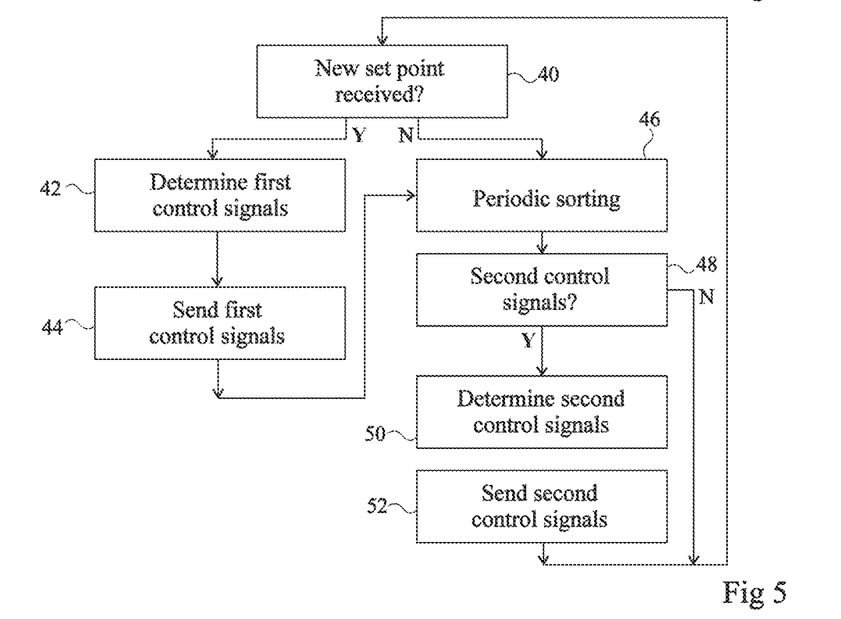
FIG. 5 is a block diagram illustrating a method of connection/disconnection of the cells of the battery shown in FIG. 1.

FIG. 5 is a block diagram illustrating a method of cell connection/disconnection control capable of being implemented by the battery 5 shown in FIG. 1.

At step 40, master control circuit BMS determines whether a new set point C has been received. If a new set point C has been received, the method carries on at step 42.

At step 42, control circuit BMS determines first control signals to follow the new set point C.

According to an embodiment where the previously-described list of valid cells is used, master control circuit BMS may use the previously-described position pointer which designates the last connected element. When the new set point C causes the connection of an additional cell of battery 5, master control circuit BMS selects the element in the list of valid cells which follows the last connected element and determines first control signals to connect the cell corresponding to this element, which then becomes the last connected element. This operation is repeated as many times as there are cells to be connected to follow the new set point C. When the new set point C causes the disconnection of a cell of battery 5, master control circuit BMS selects the last connected element and determines first control signals for disconnecting the cell corresponding to this element, the previous element in the list of valid cells becoming the last connected element. This operation is repeated as many times as there are cells to be disconnected to follow the new set point C.

According to an embodiment where the previously-described lists of connected and disconnected cells are used, when the new set point C causes the connection of an additional cell of battery 5, master control circuit BMS selects the first element in the list of disconnected cells and determines first control signals to connect the cell of battery 5 corresponding to this element. This operation is repeated as many times as there are cells to be connected to follow the new set point C. According to an embodiment, when the new set point C causes the disconnection of an additional cell of battery 5, master control circuit BMS selects the first element in the connected list and determines first control signals to disconnect the cell of battery 5 corresponding to this element. This operation is repeated as many times as there are cells to be disconnected to follow the new set point C.

In the previously-described embodiments, the selection operation may advantageously be carried out robustly since it is guaranteed that the first element in the disconnected or connected list is always available to be selected or that the element designated by a pointer or the element following the element designated by a pointer is always available to be selected. Further, the selection operation may be carried out within a limited time period since there is not step of search for elements to be connected or disconnected, the selected elements being automatically determined.

According to an embodiment, at the selection step, a selection list sorting operation is not carried out. In this case, when the previously-described list of valid cells is used, when master control circuit BMS selects the last connected element in the list of valid cells to disconnect the corresponding cell, it only modifies the position pointer which designates the last connected element. Similarly, when master control circuit BMS selects the element following the last connected element in the list of valid cells to connect the corresponding cell, it only modifies the position pointer, which now designates this element. When the previously-described lists of connected and disconnected cells are used, when master control circuit BMS selects the first element in the disconnected list, it places it in the first position of the connected list and accordingly modifies the pointers of the concerned elements, and when master control circuit BMS selects the first element in the connected list, it places it in the first position of the disconnected list and accordingly modifies the pointers of the concerned elements.

According to an embodiment, in the case where a distinction is made between the selection lists associated with a charge operation and the selection lists associated with a discharge operation, when the battery is in charge mode and at least one usable cell is connected or disconnected, master control circuit BMS modifies the list of valid cells for a charge operation (or the list of connected cells for a charge operation and the list of disconnected cells for a charge operation) but also the list of valid cells for a discharge operation (or the list of connected cells for a discharge operation and the list of disconnected cells for a discharge operation). Similarly, when the battery is in discharge mode and at least one usable cell is connected or disconnected, the master control circuit modifies the list of valid cells for a discharge operation (or the list of connected cells for a discharge operation and the list of disconnected cells for a discharge operation) but also the list of valid cells for a charge operation (or the list of connected cells for a charge operation and the list of disconnected cells for a charge operation). However, when the battery is in charge mode and at least one cell is placed in a temporary quarantine list due to a temperature/voltage cause for a charge operation, master control circuit BMS cannot place the cell in a temporary quarantine list due to a temperature/voltage cause for a discharge operation. Indeed, a cell may be placed in the temporary quarantine list due to a temperature/voltage cause for a charge operation because its state of charge exceeds a threshold while it is desirable for the cell to remain immediately available when it is passed to the discharge mode. Similarly, when the battery is in discharge mode and at least one cell is placed in a temporary quarantine list due to a temperature/voltage cause for a discharge operation, it is possible for master control circuit BMS not to place the cell in a temporary quarantine list due to a temperature/voltage cause for a charge operation. Indeed, a cell may be placed in the temporary quarantine list due to a temperature/voltage cause for a discharge operation because its state of charge falls below a threshold while it is desirable for the cell to remain immediately available when it is passed to the charge mode.

According to an embodiment, at the selection step, an operation of sorting of the selected elements of the selection lists is further carried out, particularly to take into account a possible update of the priority table. A constraint is that the sorting operation should be compatible with the result of the execution of the step of selection with no sorting operation. An example of a compatibility constraint is that if the execution of the step of selection with no sorting operation causes the disconnection of the last connected cell in the charge (or discharge) list of valid cells, the sorting operation should cause the displacement of the last connected cell into the portion of the charge (or discharge) list of valid cells gathering the disconnected cells. Another example of a compatibility constraint is that if the execution of the step of selection with no sorting operation causes the removal of the selected element from the charge (or discharge) list of connected cells and the insertion of the selected element at the head of the charge (or discharge) list of disconnected cells, the sorting operation should cause the displacement of the selected element of the charge (or discharge) list of connected cells to the charge (or discharge) list of disconnected cells at a position other than the first position. According to an embodiment, when the battery is in charge mode, the sorting operation at the selection step is carried out in the charge selection lists only and when the battery is in discharge mode, the sorting operation at the selection step is carried out in the discharge selection lists only. The sorting operation may be carried out according to different embodiments corresponding to a more or less partial sorting of the selected element.

According to an embodiment, the sorting operation corresponds to a partial sorting of the selected element, which comprises displacing the selected element at closest to the element designated by the future previous priority pointer or by the future next priority pointer if this is compatible with the result of the execution of the step of selection with no sorting operation. In the case where the previously-described list of connected cells and list of disconnected cells are used, the constraint of such a partial sorting is simply that the element designated by the future previous priority pointer or the element designated by the future next priority pointer should be in the selection list into which the selected element should be displaced. This advantageously enables to limit the duration of the execution of the sorting operation.

According to another embodiment, master control circuit BMS, for the selected element, compares the future previous priority pointer with the previous priority pointer and compares the future next priority pointer with the next priority pointer. This comparison is independent from the selection list to which the selected element belongs. In the case where the future previous priority pointer is equal to the previous priority pointer and where the future next priority pointer is equal to the next priority pointer, this means that the priority level of the selected element has not changed and that no operation of sorting of the selected element is to be performed. In the case where the future previous priority pointer is different from the previous priority pointer and/or in the case where the future next priority pointer is different from the next priority pointer, this means that a sorting of the selected element has to be performed. When there is a compatibility with the result of the execution of the step of selection with not sorting operation, the selected element is directly displaced to the location corresponding to the future previous priority pointer and to the future next priority pointer. In case of incompatibility, a partial sorting such as previously described may be implemented or the selection step may be executed with no sorting operation.

At step 44, the first control signals are transmitted by master control circuit BMS to the slave control circuits of stages $E_1$ to $E_N$ over data transmission bus BUS. The method carries on at step 46.

If, at step 40, a new set point C has not been received, the method carries on at step 46. Such an embodiment may be adapted in the case where slave control circuits 10 are capable of maintaining the signals that they supply in the absence of new orders.

As a variation, step 40 may be absent and steps 42 and 44 may be executed at each cycle. When set point value C does not vary, the first control signals may however be determined at step 42 to follow the unchanged value of set point C and these first control signals are transmitted at step 44 by master control circuit BMS to the slave control circuits of stages $E_1$ to $E_N$ over data transmission bus BUS.

At step 46, master control circuit BMS performs an operation of sorting of one of the elements of the sorting list. According to an embodiment, master control circuit BMS determines, for the first element in the sorting list, whether the previous priority pointer is equal to the future previous priority pointer and whether the next priority pointer is equal to the future next priority pointer. If such is the case, this means that the considered element is correctly placed in the selection list where it belongs. The first element is then removed from the sorting list and the next element in the sorting list is considered. If such is not the case, this means that the considered element is not correctly placed in the selection list. The operation of sorting of the considered element may then be carried out as previously described at step 42 for the selected element. In particular, a partial sorting may be implemented. According to another embodiment, a sorting operation is carried out as follows. When the future previous priority pointer and the previous priority pointer of the selected element are different, the selected element is displaced in the selection lists so that the previous pointer of the selected element becomes equal to the future previous priority pointer of the selected element. When the future next priority pointer and the next priority pointer of the selected element are different, the element designated by the future next priority pointer is displaced in the selection lists so that the previous pointer of the element designated by the future previous next pointer of the selected element designates the selected element. This advantageously enables to avoid undesirable repeated displacements of a same element between two positions.

If the considered element should not change selection list but should only be displaced in the same selection list, master control circuit BMS displaces this element, for example, by removing it from the selection list where it is located and by inserting it into this same selection list in the right place. If the considered element should change selection list, it is removed from the selection list where it is located and is inserted into another selection list in the right place.

When the displacement of an element due to a sorting operation will cause a modification in the total number of cells connected to battery 5, it is necessary to displace another element so that the total number of connected cells remains constant. The connection or the disconnection of this other element may be performed as previously described at step 42. As an example, if an element is displaced in the previously-described list of valid cells from a position corresponding to a connected cell to a position corresponding to a disconnected cell, master control circuit BMS may displace the pointer of the last connected element to the next element to cause the connection of an additional cell. According to another example, if an element is displaced from the list of connected cells to the list of disconnected cells, previously described, the first element in the list of disconnected cells may be displaced into the list of connected cells. According to an embodiment, an operation of sorting of the displaced element is further carried out. The method carries on at step 48.

At step 48, master control circuit BMS determines whether sorting step 46 requires the transmission of second connection/disconnection control signals to the slave control circuits of stages $E_1$ to $E_N$. If partial sorting step 46 does not require the transmission of second connection/disconnection control signals, the method carries on at step 40, which ends the cycle. If partial sorting step 46 requires the transmission of second connection/disconnection control signals, the method carries on at step 50.

At step 50, control circuit BMS determines second control signals to follow the sorting operation. The method carries on at step 52.

At step 52, second data are transmitted by master control circuit BMS to the slave control circuits of stages $E_1$ to $E_N$ over data transmission bus BUS. The method carries on at step 40, which ends the cycle.

In the previous embodiment, a single sorting operation per cycle is performed. As a variant, steps 46 to 50 may be repeated a determined number of times per cycle.

According to an embodiment of the method of data transmission over bus BUS, a first or a second control signal transmitted by master control circuit BMS is addressed to the slave control circuit 12 of a single module $E_i$. The slave control circuit 12 of each module $E_i$ is then capable of determining whether the control signal that it receives is addressed thereto. If this is true, slave control circuit 12 controls driver circuits 14 and 16 to apply the orders of connection/disconnection requested by master control circuit BMS. As an example, the control signals are transmitted in the form of frames, each frame comprising a header containing the address of the designated module $E_i$ followed by bytes relative to the control of the switches, and possibly followed by at least one control byte. An advantage of such an embodiment is that the reactivity of battery 5 on reception of a new set point C is optimal. Further, the switchings of the switches of modules $E_i$ are spread over time so that the generation of electromagnetic disturbances is decreased. Further, an efficient frame error control may be implemented.

According to another embodiment of the data transmission method, each frame transmitted by master control circuit BMS contains all the connection/disconnection orders for all the cells $C_k$ of all modules $E_i$. The slave control circuit 12 of each module $E_i$ is thus used for each frame sent by master control circuit BMS. The slave control circuit 12 of each module $E_i$ is capable of analyzing the frame by extracting the orders of connection/disconnection of the switches belonging to module $E_i$.

In the previously-described embodiment, the first control signals are transmitted at step 44 and the second control signals are transmitted at step 52. As a variant, the first and second control signals may be transmitted at step 52. In this case, master control circuit BMS may determine whether a slave control circuit 12 is driven by different control signals and may determine a single control signal for this slave control circuit 12 integrating the different control signals.

Figure 6:
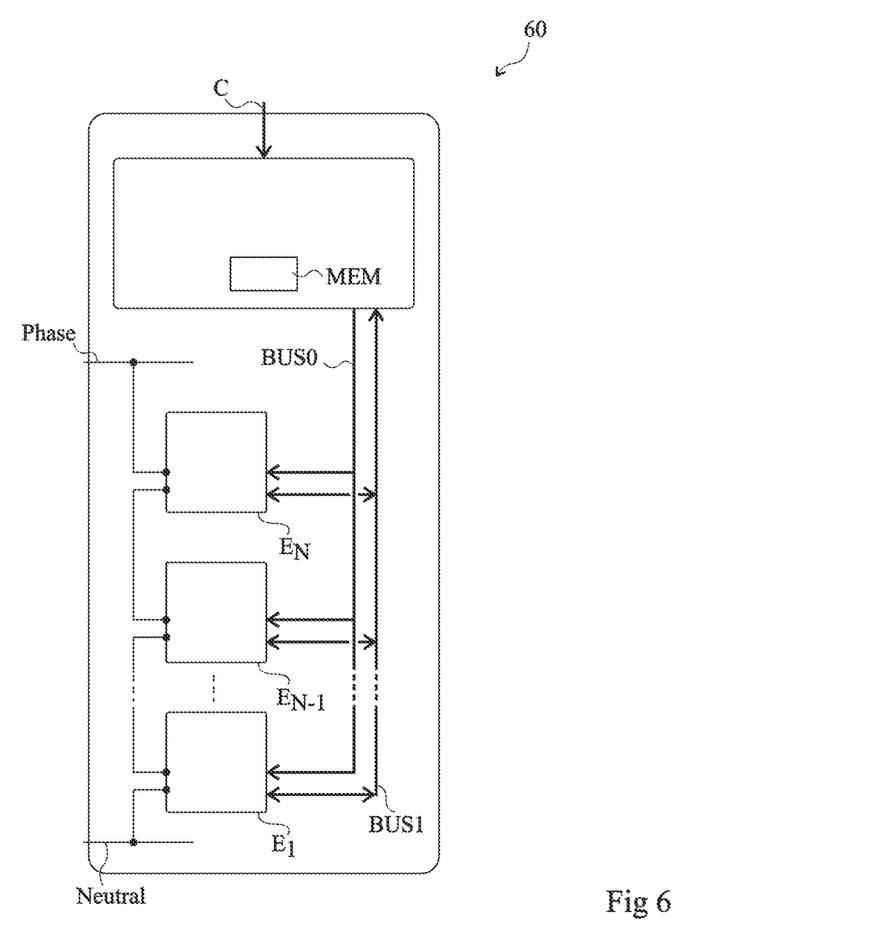
FIG. 6 partially and schematically shows another embodiment of a cell battery.

FIG. 6 shows an embodiment of a battery 60. Battery 40 comprises all the elements of battery 5 shown in FIG. 1, with the difference that data transmission bus BUS is replaced with two data transmission buses BUS0 and BUS1, which each couple master control circuit BMS to each module $E_1$ to $E_N$.

Data transmission bus BUS0 is a fast bus, that is, a bus over which data are transmitted at a rate greater than 3 megabits per second, preferably in the range from 5 megabits per second to 7 megabits per second. Data transmission bus BUS0 may be a unidirectional bus. As an example, bus BUS0 is a bus according to the RS485 standard.

Bus BUS1 is a slow bus, that is, a bus over which the data are transmitted at a rate smaller than 3 megabits per second, preferably in the range from 0.5 megabits per second to 1 megabit per second. Bus BUS1 is a bidirectional bus. As an example, bus BUS1 is a CAN data bus, particularly according to ISO standard 11898, which advantageously integrates a communication arbitration management.

Fast bus BUS0 is used for the transmission of the first and second control signals supplied by master control circuit BMS to follow set point C. Slow bus BUS1 is used for the exchange of all the other data between master control circuit BMS and each module $E_1$ to $E_N$.

Specific embodiments of the present invention have been described. Various alterations and modifications will occur to those skilled in the art. Although FIG. 2 shows an embodiment of arrangement of the cells and of the switches of a module $E_i$, it should be clear that the structure of each module $E_i$ may be different. In particular, the structure of each module $E_i$ may correspond to one of the structures described in patent application WO 2012/117110.

The invention claimed is:

1. A method of controlling an electric system comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the electric cells to one another and to the third and fourth terminals of the module, and a second switch control circuit, the electric system further comprising at least one first data transmission bus, coupling the first control circuit to each second control circuit, the first control circuit comprising a memory having chained lists stored therein, each chained list comprising elements each comprising an identifier of one of the electric cells and at least one first pointer designating another element in the chained list, the method comprising the steps of:
   a) reception, by the first control circuit, of a set point;
   b) transmission, by the first control circuit to the second control circuits, of first control signals for the connection or the disconnection of at least one of the electric cells of the modules to follow said set point, the first control signals being determined based on the chained lists; and
   c) transmission, by the first control circuit to the second control circuits, of second control signals for the connection of one of the electric cells and the disconnection of another electric cell among the electric cells, the second control signals being determined based on the chained lists.

2. The control method according to claim 1, wherein the set point is selected from the group comprising a set point for the delivery of a voltage between the first and second terminals, a set point for the delivery of a current at the first terminal, or a set point for the number of electric cells.

3. The control method according to claim 1, comprising the determination by the first control circuit, for at least one first element among the elements of one of the chained lists, of a new value of a second pointer designating a second element in the chained list or a third element in another chained list, and wherein step c) comprises the successive steps of:
   d) determining whether the first and second pointers of said element are different; and
   e) in the case where the first and second pointers are different, replacing the first pointer with the second pointer and transmitting, from the first control circuit to the second control circuits, second control signals for the connection or the disconnection of the electric cell corresponding to the identifier of the first element.

4. The control method according to claim 3, wherein step e) comprises, in the case of the connection of the electric cell corresponding to the identifier of the first element, transmitting second control signals for the disconnection of the electric cell corresponding to the identifier of a fifth element and, in the case of the disconnection of the electric cell corresponding to the identifier of the first element, transmitting second control signals for the connection of the electric cell corresponding to the identifier of a fifth element.

5. The control method according to claim 3, comprising the determination by the first control circuit of a chained list comprising elements for each of which a new value of the second pointer has been determined.

6. The control method according to claim 1, wherein steps a), be, and c) are repeated cyclically, steps a) and b) being absent at least for one cycle when the set point value does not vary at said cycle.

7. The control method according to claim 1, wherein all the elements of one of the chained lists comprise identifiers of electric cells which are connected.

8. The control method according to claim 1, wherein all the elements of one of the chained lists comprise identifiers of electric cells which are not connected and capable of being connected.

9. The control method according to claim 1, wherein all the elements of one of the chained lists comprise identifiers of electric cells which are not connected and placed in quarantine.

10. The control method according to claim 1, comprising a first chained list among the chained lists associated with an operation of charge of the electric system and a second chained list among the chained lists associated with an operation of discharge of the electric system and the use, at steps b) and c), by the first control circuit, of the first chained list when the electric system is in charge mode and of the second chained list when the electric system is in discharge mode.

11. The control method according to claim 1, comprising a step of static allocation of a portion of the memory by the first control circuit, having the chained lists stored therein.

12. An electric system comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the electric cells to one another and to the third and fourth terminals of the module, and a second switch control circuit, the electric system further comprising at least one first data transmission bus, coupling the first control circuit to each second control circuit, the first control circuit comprising a memory having chained lists stored therein, each chained list comprising elements each comprising an identifier of one of the electric cells and at least one first pointer designating another element in the chained list, the first control circuit being capable of:
   a) receiving a set point;
   b) transmitting to the second control circuits first control signals for the connection or the disconnection of at least one of the electric cells of the modules to follow said set point, the first control signals being determined based on the chained lists; and
   c) transmitting to the second control circuits second control signals for the connection of one of the electric cells and the disconnection of another electric cell among the electric cells, the second control signals being determined based on the chained lists.

13. The electric system according to claim 12, comprising a second data transmission bus coupling the first control circuit to each second control circuit, wherein the first control circuit is capable of transmitting first data to the second control circuits over the first bus at a first rate and is capable of transmitting second data to the second control circuits over the second bus at a second rate smaller than the first rate.

* * * * *